US009239024B2

(12) United States Patent
Beikmann

(10) Patent No.: US 9,239,024 B2
(45) Date of Patent: Jan. 19, 2016

(54) RECURSIVE FIRING PATTERN ALGORITHM FOR VARIABLE CYLINDER DEACTIVATION IN TRANSIENT OPERATION

(71) Applicant: GM Global Technology Operations LLC, Detroit, MI (US)

(72) Inventor: Randall S. Beikmann, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 219 days.

(21) Appl. No.: 13/798,737

(22) Filed: Mar. 13, 2013

(65) Prior Publication Data

US 2014/0069379 A1 Mar. 13, 2014

Related U.S. Application Data

(60) Provisional application No. 61/699,014, filed on Sep. 10, 2012.

(51) Int. Cl.

| | |
|---|---|
| ***F02D 17/00*** | (2006.01) |
| ***F02D 41/00*** | (2006.01) |
| ***F02D 13/02*** | (2006.01) |
| ***F02D 13/06*** | (2006.01) |
| ***F02D 17/02*** | (2006.01) |

(52) U.S. Cl.
CPC ........ *F02D 41/0087* (2013.01); *F02D 13/0219* (2013.01); *F02D 13/06* (2013.01); *F02D 17/02* (2013.01); *F02D 2041/0012* (2013.01)

(58) Field of Classification Search
CPC ..... F02D 41/0087; F02D 13/06; F02D 17/00; F02D 17/02; F02D 17/023; F02D 17/026
See application file for complete search history.

(56) References Cited

U.S. PATENT DOCUMENTS

| | | | |
|---|---|---|---|
| 4,509,488 | A | 4/1985 | Forster et al. |
| 4,535,744 | A | 8/1985 | Matsumura |
| 5,042,444 | A | 8/1991 | Hayes et al. |
| 5,094,213 | A | 3/1992 | Dudek et al. |
| 5,357,932 | A | 10/1994 | Clinton et al. |
| 5,423,208 | A | 6/1995 | Dudek et al. |
| 5,465,617 | A | 11/1995 | Dudek et al. |
| 5,669,354 | A | 9/1997 | Morris |
| 6,760,656 | B2 | 7/2004 | Matthews et al. |
| 6,978,204 | B2 | 12/2005 | Surnilla et al. |

(Continued)

OTHER PUBLICATIONS

U.S. Appl. No. 14/449,726, filed Aug. 1, 2014, Hayman et al.

(Continued)

*Primary Examiner* — Lindsay Low
*Assistant Examiner* — Jacob Amick

(57) ABSTRACT

A cylinder control module generates a desired cylinder activation/deactivation sequence for a future period based on Q predetermined cylinder activation/deactivation sub-sequences used during a previous period, a desired number of cylinders to be activated during a predetermined period including the previous and future periods, and an operating condition. Q is an integer greater than zero. The cylinder control module activates and deactivates opening of intake and exhaust valves of first and second ones of the cylinders that are to be activated and deactivated based on the desired cylinder activation/deactivation sequence, respectively. A fuel control module provides and disables fuel to the first and second ones of the cylinders, respectively.

20 Claims, 5 Drawing Sheets

(56) References Cited

U.S. PATENT DOCUMENTS

| | | | | |
|---|---|---|---|---|
| 7,066,121 | B2 | 6/2006 | Michelini et al. | |
| 7,100,720 | B2 | 9/2006 | Ishikawa | |
| 7,292,231 | B2 | 11/2007 | Kodama et al. | |
| 7,363,111 | B2 | 4/2008 | Vian et al. | |
| 7,577,511 | B1 | 8/2009 | Tripathi et al. | |
| 7,785,230 | B2 | 8/2010 | Gibson et al. | |
| 7,849,835 | B2 | 12/2010 | Tripathi et al. | |
| 7,886,715 | B2 | 2/2011 | Tripathi et al. | |
| 7,930,087 | B2 | 4/2011 | Gibson et al. | |
| 7,954,474 | B2 | 6/2011 | Tripathi et al. | |
| 8,099,224 | B2 | 1/2012 | Tripathi et al. | |
| 8,131,445 | B2 | 3/2012 | Tripathi et al. | |
| 8,131,447 | B2 | 3/2012 | Tripathi et al. | |
| 8,146,565 | B2 | 4/2012 | Leone et al. | |
| 8,616,181 | B2 | 12/2013 | Sahandiesfanjani et al. | |
| 8,646,435 | B2 | 2/2014 | Dibble et al. | |
| 8,701,628 | B2 | 4/2014 | Tripathi et al. | |
| 2003/0131820 | A1 | 7/2003 | Mckay et al. | |
| 2005/0016492 | A1 | 1/2005 | Matthews | |
| 2005/0235743 | A1 | 10/2005 | Stempnik et al. | |
| 2006/0107919 | A1 | 5/2006 | Nishi et al. | |
| 2007/0131196 | A1 | 6/2007 | Gibson et al. | |
| 2008/0288146 | A1 | 11/2008 | Beechie et al. | |
| 2009/0177371 | A1 | 7/2009 | Reinke | |
| 2010/0006065 | A1 | 1/2010 | Tripathi et al. | |
| 2010/0010724 | A1 | 1/2010 | Tripathi et al. | |
| 2010/0100299 | A1 * | 4/2010 | Tripathi et al. | 701/102 |
| 2011/0048372 | A1 | 3/2011 | Dibble et al. | |
| 2011/0208405 | A1 | 8/2011 | Tripathi et al. | |
| 2011/0213540 | A1 | 9/2011 | Tripathi et al. | |
| 2011/0213541 | A1 | 9/2011 | Tripathi et al. | |
| 2011/0251773 | A1 | 10/2011 | Sahandiesfanjani et al. | |
| 2012/0109495 | A1 | 5/2012 | Tripathi et al. | |
| 2012/0143471 | A1 | 6/2012 | Tripathi et al. | |
| 2013/0092128 | A1 | 4/2013 | Pirjaberi et al. | |

OTHER PUBLICATIONS

U.S. Appl. No. 14/211,389, filed Mar. 14, 2014, Liu et al.
U.S. Appl. No. 14/300,469, filed Jun. 10, 2014, Li et al.
U.S. Appl. No. 14/310,063, filed Jun. 20, 2014, Wagh et al.
U.S. Appl. No. 13/798,351, filed Mar. 13, 2013, Rayl.
U.S. Appl. No. 13/798,384, filed Mar. 13, 2013, Burtch.
U.S. Appl. No. 13/798,400, filed Mar. 13, 2013, Phillips.
U.S. Appl. No. 13/798,435, filed Mar. 13, 2013, Matthews.
U.S. Appl. No. 13/798,451, filed Mar. 13, 2013, Rayl.
U.S. Appl. No. 13/798,471, filed Mar. 13, 2013, Matthews et al.
U.S. Appl. No. 13/798,518, filed Mar. 13, 2013, Beikmann.
U.S. Appl. No. 13/798,536, filed Mar. 13, 2013, Matthews et al.
U.S. Appl. No. 13/798,540, filed Mar. 13, 2013, Brennan et al.
U.S. Appl. No. 13/798,574, filed Mar. 13, 2013, Verner.
U.S. Appl. No. 13/798,586, filed Mar. 13, 2013, Rayl et al.
U.S. Appl. No. 13/798,590, filed Mar. 13, 2013, Brennan et al.
U.S. Appl. No. 13/798,624, filed Mar. 13, 2013, Brennan et al.
U.S. Appl. No. 13/798,701, filed Mar. 13, 2013, Burleigh et al.
U.S. Appl. No. 13/798,775, filed Mar. 13, 2013, Phillips.
U.S. Appl. No. 13/799,116, filed Mar. 13, 2013, Brennan.
U.S. Appl. No. 13/799,129, filed Mar. 13, 2013, Beikmann.
U.S. Appl. No. 13/799,181, filed Mar. 13, 2013, Beikmann.
U.S. Appl. No. 14/548,501, filed Nov. 20, 2014, Beikmann et al.
U.S. Appl. No. 61/952,737, filed Mar. 13, 2014, Shost et al.

* cited by examiner

RECURSIVE FIRING PATTERN ALGORITHM FOR VARIABLE CYLINDER DEACTIVATION IN TRANSIENT OPERATION

CROSS-REFERENCE TO RELATED APPLICATIONS

This application claims the benefit of U.S. Provisional Application No. 61/699,014, filed on Sep. 10, 2012. The disclosure of the above application is incorporated herein by reference in its entirety.

This application is related to U.S. patent application Ser. No. 13/798,451 filed on Mar. 13, 2013, Ser. No. 13/798,351 filed on Mar. 13, 2013, Ser. No. 13/798,586 filed on Mar. 13, 2013, Ser. No. 13/798,590 filed on Mar. 13, 2013, Ser. No. 13/798,536 filed on Mar. 13, 2013, Ser. No. 13/798,435 filed on Mar. 13, 2013, Ser. No. 13/798,471 filed on Mar. 13, 2013, Ser. No. 13/798,701 filed on Mar. 13, 2013, Ser. No. 13/798,518 filed on Mar. 13, 2013, Ser. No. 13/799,129 filed on Mar. 13, 2013, Ser. No. 13/798,540 filed on Mar. 13, 2013, Ser. No. 13/798,574 filed on Mar. 13, 2013, Ser. No. 13/799,181 filed on Mar. 13, 2013, Ser. No. 13/799,116 filed on Mar. 13, 2013, Ser. No. 13/798,624 filed on Mar. 13, 2013, Ser. No. 13/798,384 filed on Mar. 13, 2013, Ser. No. 13/798,775 filed on Mar. 13, 2013, and Ser. No. 13/798,400 filed on Mar. 13, 2013. The entire disclosures of the above applications are incorporated herein by reference.

FIELD

The present disclosure relates to cylinder deactivation control systems and methods for an internal combustion engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

Under some circumstances, one or more cylinders of an engine may be deactivated. Deactivation of a cylinder may include deactivating the opening and closing of intake valves of the cylinder and halting the fueling of the cylinder. One or more cylinders may be deactivated, for example, to decrease fuel consumption when the engine can produce a requested amount of torque while the one or more cylinders are deactivated.

SUMMARY

A cylinder control module: generates a desired cylinder activation/deactivation sequence for cylinders of an engine and for a first predetermined number of crankshaft revolutions using N predetermined cylinder activation/deactivation sub-sequences; activates opening of intake and exhaust valves of first ones of the cylinders that are to be activated based on the desired cylinder activation/deactivation sequence; and deactivates opening of intake and exhaust valves of second ones of the cylinders that are to be deactivated based on the desired cylinder activation/deactivation sequence. Each of the N predetermined cylinder activation/deactivation sub-sequences corresponds to a second predetermined number of crankshaft revolutions. N is an integer greater than zero, and the second predetermined number is less than the first predetermined number. A fuel control module provides fuel to the first ones of the cylinders and disables fueling to the second ones of the cylinders. The cylinder control module further generates the desired cylinder activation/deactivation sequence for a future period based on a desired number of the cylinders to be activated during a predetermined period, P of the N predetermined cylinder activation/deactivation sub-sequences, and an operating condition. The future period follows the first predetermined number of crankshaft revolutions, the predetermined period includes the first predetermined number of crankshaft revolutions and the future period, and P is an integer between zero and N, inclusive.

In other features, a cylinder control module generates a desired cylinder activation/deactivation sequence for a future period based on Q predetermined cylinder activation/deactivation sub-sequences used during a previous period, a desired number of cylinders to be activated during a predetermined period including the previous and future periods, and an operating condition. Q is an integer greater than zero. The cylinder control module further: activates opening of intake and exhaust valves of first ones of the cylinders that are to be activated based on the desired cylinder activation/deactivation sequence; and deactivates opening of intake and exhaust valves of second ones of the cylinders that are to be deactivated based on the desired cylinder activation/deactivation sequence. A fuel control module provides fuel to the first ones of the cylinders and disables fueling to the second ones of the cylinders.

In still other features, a cylinder control method includes: generating a desired cylinder activation/deactivation sequence for cylinders of an engine and for a first predetermined number of crankshaft revolutions using N predetermined cylinder activation/deactivation sub-sequences; activating opening of intake and exhaust valves of first ones of the cylinders that are to be activated based on the desired cylinder activation/deactivation sequence; and deactivating opening of intake and exhaust valves of second ones of the cylinders that are to be deactivated based on the desired cylinder activation/deactivation sequence. Each of the N predetermined cylinder activation/deactivation sub-sequences corresponds to a second predetermined number of crankshaft revolutions. N is an integer greater than zero, and the second predetermined number is less than the first predetermined number. The cylinder control method further includes: providing fuel to the first ones of the cylinders; disabling fueling to the second ones of the cylinders; and generating the desired cylinder activation/deactivation sequence for a future period based on a desired number of the cylinders to be activated during a predetermined period, P of the N predetermined cylinder activation/deactivation sub-sequences, and an operating condition. The future period follows the first predetermined number of crankshaft revolutions, the predetermined period includes the first predetermined number of crankshaft revolutions and the future period, and P is an integer between zero and N, inclusive.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
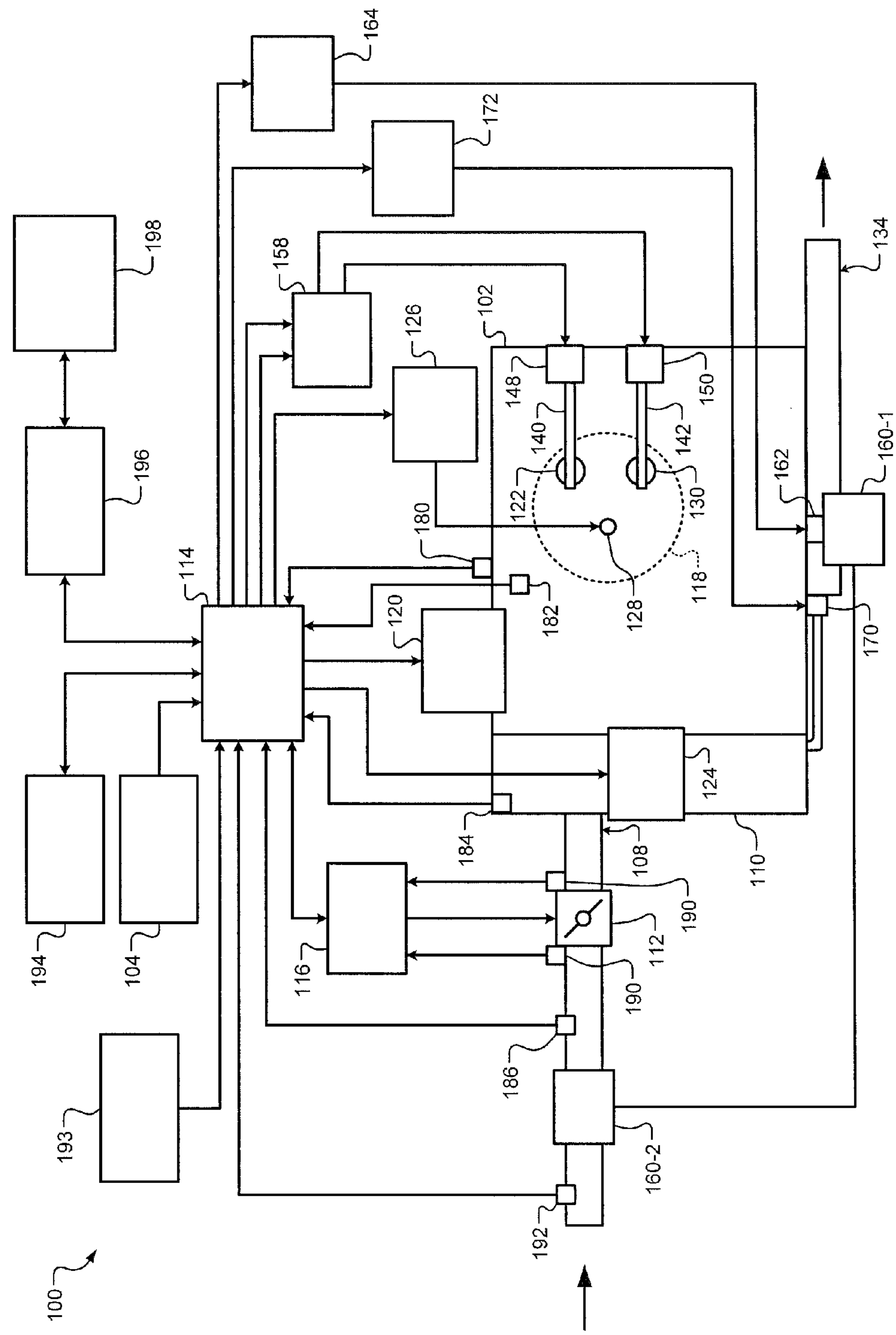
FIG. 1 is a functional block diagram of an example engine system according to the present disclosure.

In variable cylinder deactivation (VCD) systems, one or more cylinders of an engine of a vehicle may be deactivated and/or operated according to a selected deactivation pattern (i.e., sequence). Accordingly, a commanded number of cylinders, less than a total number of cylinders (normally fired) in an engine, may be fired over a given number of crankshaft revolutions or engine cycles. For example, the engine includes a plurality of possible deactivation patterns, and a control module determines which of the deactivation patterns to implement and selects a deactivation pattern accordingly. The cylinders of the engine are selectively operated (i.e., fired or not fired) through one or more engine cycles based on the deactivation pattern. An engine cycle may refer to the period over which each of the cylinders undergoes a complete combustion cycle and may correspond to two crankshaft revolutions in a four-stroke engine.

For example only, the control module of the vehicle determines the selected deactivation pattern based on a variety of factors including, but not limited to, a desired Effect Cylinder Count (ECC), respective fuel economies associated with each of the deactivation patterns, and/or noise and vibration (N&V) associated each of the deactivation patterns. Fuel efficiency and N&V are, at least in part, based on the sequence in which cylinders are activated and deactivated (i.e., the deactivation pattern).

Each of a plurality of predetermined patterns may correspond to the desired ECC when the ECC is an integer (e.g., 1, 2, 3, . . . , n, where n is the number of cylinders in the engine). The desired ECC corresponds to a desired engine output torque. In some circumstances, a desired ECC is a non-integer value (i.e., a non-integer ECC). Accordingly, for a given number of cycles, a first deactivation pattern including a first ECC (e.g., 5) may be used in one or more of the cycles, while a second deactivation pattern including a second ECC (e.g., 6) may be used in other cycles. As a result, an average ECC over the given number of cycles may correspond to the desired non-integer ECC (e.g., 5.5). The ECC of a pattern that is shorter than the total number of cylinders available for firing per cycle (n) may be equal to the number of activated cylinders of the pattern divided by the number of events in the pattern multiplied by the total number of cylinders available for firing per cycle (n).

The resulting variable deactivation pattern may not be periodic as different deactivation patterns are implemented in respective cycles. For example only, the deactivation pattern may be random and/or pseudorandom. Accordingly, some variable deactivation patterns cause undesirable vehicle vibration (i.e., adversely affect N&V). Torque output, engine speed, vehicle sensitivity to pulsating torque as a function of frequency, and/or other factors may contribute to N&V for a given deactivation pattern.

In a cylinder deactivation system according to the principles of the present disclosure, future deactivation patterns (for example only, for the next two cycles) are selected to minimize N&V (including minimizing harmonic vibration and impulsive vibration), minimize air induction and exhaust noise, and maximize torque delivery smoothness for given operating conditions of the vehicle. The deactivation patterns are selected based on a given number of previous deactivation patterns (for example only, the previous six cycles). As the operating conditions of the vehicle change, different future deactivation patterns are selected accordingly.

Referring now to FIG. 1, a functional block diagram of an example engine system 100 is presented. The engine system 100 of a vehicle includes an engine 102 that combusts an air/fuel mixture to produce torque based on driver input from a driver input module 104. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle. The four strokes, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may halt provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by deactivating opening of the intake valve 122 and/or the exhaust valve 130. The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158. In various other implementations, the intake valve 122 and/or the exhaust valve 130 may be controlled by actuators other than camshafts, such as electromechanical actuators, electrohydraulic actuators, electromagnetic actuators, etc.

The engine system 100 may include a boost device that provides pressurized air to the intake manifold 110. For example, FIG. 1 shows a turbocharger including a turbine 160-1 that is driven by exhaust gases flowing through the exhaust system 134. The turbocharger also includes a compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. Although shown separated for purposes of illustration, the turbine 160-1 and the compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

Crankshaft position may be measured using a crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The engine 102 outputs torque to a transmission (not shown) via the crankshaft. One or more coupling devices, such as a torque converter and/or one or more clutches, regulate torque transfer between a transmission input shaft and the crankshaft. Torque is transferred between the transmission input shaft and a transmission output shaft via the gears.

Torque is transferred between the transmission output shaft and wheels of the vehicle via one or more differentials, driveshafts, etc. Wheels that receive torque output by the transmission will be referred to as drive wheels. Wheels that do not receive torque from the transmission will be referred to as undriven wheels.

The ECM 114 may communicate with a hybrid control module 196 to coordinate operation of the engine 102 and one or more electric motors 198. The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. Each engine actuator receives an actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to a cylinder activation/deactivation sequence, fueling rate, intake and exhaust cam phaser angles, boost pressure, and EGR valve opening area, respectively. The ECM 114 may generate the actuator values in order to cause the engine 102 to generate a desired engine output torque.

The ECM 114 and/or one or more other modules of the engine system 100 may implement the cylinder deactivation system of the present disclosure. For example, the ECM 114 selects one or more future deactivation sub-sequences based on previous deactivation sub-sequences and current operating conditions of the vehicle to minimize N&V. The ECM 114 controls the cylinder actuator module 120 according to the selected deactivation sub-sequences. For example only, the ECM 114 selects the deactivation sub-sequences from a plurality of predetermined sub-sequences based on one or more factors corresponding to the operating conditions of the vehicle, including, but not limited to, engine speed, requested torque, a selected gear, air per cylinder (APC, e.g., an estimate or calculation of the mass of air in each cylinder), residual exhaust per cylinder (RPC, e.g., a mass of residual exhaust gas in each cylinder), and respective cylinder identifications (IDs). For example only, the ECM 114 selects the deactivation sub-sequences from a lookup table comprising the predetermined sub-sequences based on the operating conditions of the vehicle.

For example only, a sequence of deactivation sub-sequences for a four-stroke, eight cylinder (e.g., V8) engine to achieve a desired ECC (effective cylinder count) of 5.5 is described. Other sequences can be used to achieve a desired ECC of 5.5 and other desired ECCs (integer and non-integer). The example sequence includes sub-sequences for twelve cycles as follows, where a “1” indicates an activated cylinder event and a “0” indicates a deactivated cylinder event:

10110101
10110101
11011101
11011101
11010110
11010110
11011101
11011101
11011010
11011010
11101101
11101101

In the example sequence of deactivation sub-sequences (above), a total of 66 cylinders are fired over twelve cycles for an average ECC of 5.5 (i.e., 66/12). The example sequence includes six sub-sequences, each sub-sequence being used twice in a row. A first deactivation sub-sequence (10110101) is repeated in the first and second cycles. A second deactivation sub-sequence (11011101) is repeated in the third and fourth cycles. A third deactivation sub-sequence (11010110) is repeated in the fifth and sixth cycles. The second deactivation sub-sequence is repeated in the seventh and eighth cycles. A fourth deactivation sub-sequence (11011010) is repeated in the ninth and tenth cycles. A fifth deactivation sub-sequence (11101101) is repeated in the eleventh and twelfth cycles. Accordingly, different deactivation sub-sequences are used in a sequence to achieve the desired ECC.

For any given sequence, the ECM 114 selects the deactivation sub-sequence to be included in the sequence based on the current operating conditions of the vehicle to minimize N&V. The ECM 114 selects future sub-sequences and/or deactivation patterns for a sequence (using, for example only, a recursive algorithm) based on changing operating conditions of the vehicle and the most recently used deactivation patterns. For example only, certain deactivation patterns may contribute to N&V when used successively or in close proximity to one another. Conversely, certain deactivation patterns may reduce N&V when used after certain other deactivation patterns. The ECM 114 continuously monitors which deactivation patterns are used to ensure that future deactivation patterns to be used in a given sequence minimize N&V.

For example, the ECM 114 may select $N_F$ future (i.e., next) sub-sequences based on $N_R$ recent (e.g., immediately previous) sub-sequences. An example Table 1 is shown below for $N_R=3$ and $N_F=1$, where each sub-sequence corresponds to a deactivation sub-sequence that is repeated twice. In other words, in the example, the ECM 114 selects a next sub-sequence to be used during the next cycle (2 revolutions) based on the previous three sub-sequences used during the last six cycles:

TABLE 1

| | Cycle 1-2 Sub-Seq 1 | Cycle 3-4 Sub-Seq 2 | Cycle 5-6 Sub-Seq 3 | Cycle 7-8 Sub-Seq 4 | Cycle 9-10 Sub-Seq 5 | Cycle 11-12 Sub-Seq 6 |
|---|---|---|---|---|---|---|
| Assignment 1 | 10110101 | 11011101 | 11010110 | 11011101 | 11011010 | 11101101 |
| Assignment 2 | 10110101 | 11011101 | 11010110 | 11011101 | 11011010 | 11101101 |
| Assignment 3 | 10110101 | 11011101 | 11010110 | 11011101 | 11011010 | 11101101 |

In Table 1, the ECM 114 selects a deactivation sub-sequence 11011101 (shown in bold) in a first assignment for a sub-sequence (4) corresponding to cycles 7-8 based on the previous three sub-sequences (shown in italics) for cycles 1-6. Then, the ECM 114 selects a different deactivation sub-sequence 11011010 in a second assignment for a sub-sequence (5) corresponding to cycles 9-10 based on the previous three sub-sequences for cycles 3-8. In other words, the previously selected deactivation sub-sequence for cycles 7-8 is now considered as a previous sub-sequence for selecting the next sub-sequence for cycles 9-10. Similarly, in a third assignment, the ECM 114 selects still another deactivation sub-sequence 11101101 for a third sub-sequence (6) corresponding to cycles 11-12 based on the previous three sub-sequences for cycles 5-10.

Accordingly, after every sub-sequence is executed, the ECM 114 re-evaluates the previous sub-sequences to select a suitable deactivation pattern for the next sub-sequence. Although the sub-sequences are described as including one deactivation sub-sequence and two cycles, any number of deactivation sub-sequences and/or cycles may be used in a sub-sequence. Further, other values of $N_R$ and $N_F$ may be used. For example only, the ECM 114 selects the deactivation sub-sequence for the next sub-sequence from a lookup table based on the previous sub-sequences and the current operating conditions of the vehicle.

Further, the ECM 114 may select different next deactivation patterns for the same previous sub-sequences. In other words, if the previous sub-sequences correspond to deactivation patterns A, B, and C, the ECM 114 does not necessarily always select the same next deactivation pattern D. For example, the ECM 114 may select one of two or more possible next deactivation patterns when a given group of previous sub-sequences is detected. For example only, each of the possible next deactivation patterns may be assigned a distribution percentage, and the ECM 114 selects the next deactivation pattern based on the distribution percentage (i.e., a first deactivation pattern may be selected 60% of the time and a second deactivation pattern may be selected 40% of the time). Alternatively, for some previous sub-sequences, the ECM 114 always selects the same next deactivation pattern, while for other previous sub-sequences, the ECM 114 selects between two or more deactivation patterns according to respective distribution percentages as shown below in Table 2.

TABLE 2

| Most Recent Pattern | | | Future Pattern Assigned | |
|---|---|---|---|---|
| Rev 1-2 | Rev 3-4 | Rev 5-6 | Pattern | Distribution |
| 10110101 | 11011101 | 11010110 | 11011101 | 40% |
| | | | 01101111 | 60% |
| 11011101 | 11010110 | 11011101 | 11011010 | 100% |
| 11011101 | 11010110 | 01101111 | 10101101 | 100% |

Each of the sub-sequences available for selection by the ECM 114 may be categorized according to a number $N_F$ of cylinders that are fired in the corresponding deactivation sub-sequence. For example only, a list of possible deactivation sub-sequences with five and six fired cylinders for a sub-sequence length of 8 is shown below in Table 3. The length of the sub-sequences can be less than, greater than, or equal to the total number of cylinders of the engine. Each of the sub-sequences is assigned a designation (e.g., 5_01) to identify the sub-sequence.

TABLE 3

| 5 Cylinders Firing | | 6 Cylinders Firing | |
|---|---|---|---|
| Designation | Sub-Sequence | Designation | Sub-Sequence |
| 5_01 | 00011111 | 6_01 | 00111111 |
| 5_02 | 00101111 | 6_02 | 01011111 |
| . | . | . | . |
| . | . | . | . |
| . | . | . | . |
| 5_10 | 01011101 | 6_10 | 10110111 |

TABLE 3-continued

| 5 Cylinders Firing | | 6 Cylinders Firing | |
|---|---|---|---|
| Designation | Sub-Sequence | Designation | Sub-Sequence |
| 5_11 | 01011110 | 6_11 | 10111011 |
| . | . | . | . |
| . | . | . | . |
| . | . | . | . |
| 5_28 | 10101011 | 6_28 | 11111100 |
| . | . | | |
| . | . | | |
| . | . | | |
| 5_56 | 11111000 | | |

For example only, the distribution assignments described in Table 2 are combined with the sub-sequence designations described in Table 3 as shown below in Table 4.

TABLE 4

| Most Recent Pattern | | | Future Pattern Assigned | |
|---|---|---|---|---|
| Cycle 1-2 | Cycle 3-4 | Cycle 5-6 | Pattern | Distribution |
| 5_32 | 6_17 | 5_43 | 6_17 | 40% |
| | | | 6_16 | 60% |
| 6_17 | 5_43 | 6_17 | 5_45 | 100% |
| 6_17 | 5_43 | 6_16 | 5_29 | 100% |

Figure 2:
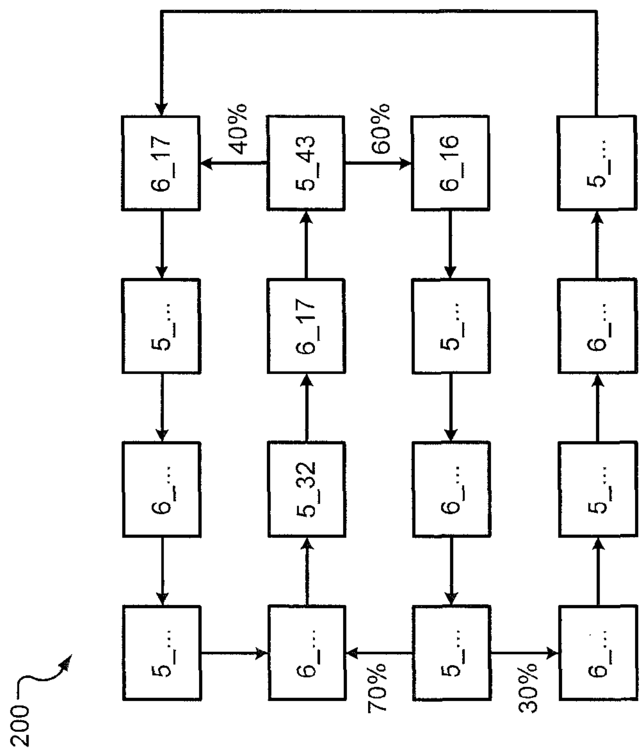
FIG. 2 illustrates a first example array of selected subsequences for cylinder deactivation according to the present disclosure.

Referring now to FIG. 2, an example array 200 of selected sub-sequences for achieving a desired ECC of 5.5, as identified by respective designations, is shown. Sub-sequences identified by a specific designation (e.g., "5_32") correspond to specific sub-sequences selected by the ECM 114. Conversely, sub-sequences identified by " . . . " correspond to an instance where any sub-sequence having the identified number of fired cylinders (e.g., "5_ . . . ") may be used. For example only, a first sequence 6_17, 5_ . . . , 6_ . . . , 5_ . . . is followed by a second sequence 6_ . . . , 5_32, 6_17, 5_43. After the sub-sequence 5_43, the first sequence is selected 40% of the time and a third sequence 6_16, 5_ . . . , 5_ . . . is selected 60% of the time. After the third sequence, the second sequence is selected 70% of the time and a fourth sequence 6_ . . . , 5_ . . . 6_ . . . , 5_ . . . is selected 30% of the time. Although each sequence is shown having four sub-sequences, any number of sub-sequences could be used, and different sequences could include different numbers of sub-sequences.

Figure 3:
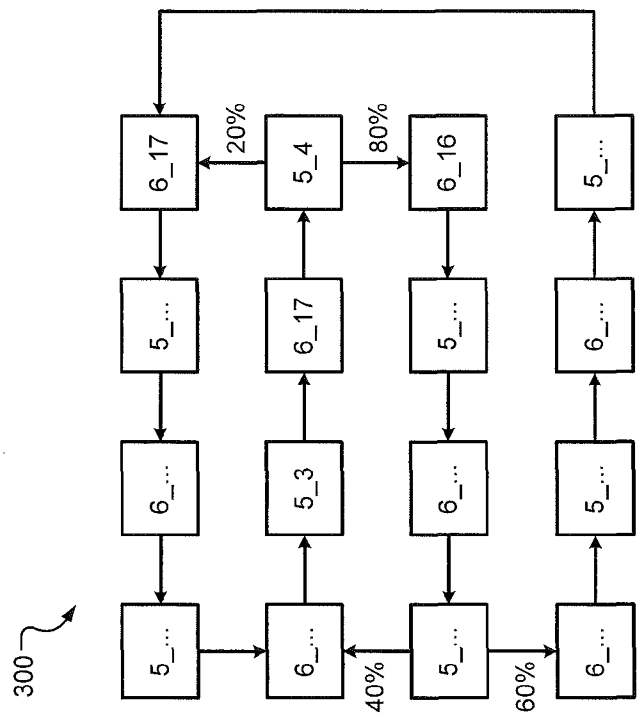
FIG. 3 illustrates a second example array of selected subsequences for cylinder deactivation according to the present disclosure.

Referring now to FIG. 3, different sequences and sub-sequences may be selected based on different operating conditions of the vehicle (e.g., engine speed). Acceptable (e.g., desired) N&V may be different at different engine speeds. For example only, the sequences shown in FIG. 2 may correspond to an engine speed of 1400 RPM. As engine speed increase (or decreases), some of the sequences shown in FIG. 2 may no longer be acceptable, while other sequences that were not acceptable at 1400 RPM become acceptable at a different engine speed. Accordingly, each sequence and/or sub-sequence may also be associated with a respective allowable engine speed range. FIG. 3 illustrates an example array 300 of selected sub-sequences for achieving a desired ECC of 5.5 at, for example only, 1800 RPM.

Further, as requested torque increases and/or decreases (i.e., transient torque demand), the desired ECC and the corresponding selected sequences change accordingly. For example, to change from an ECC of 5.0 to an ECC of 6.0, the ECC of the selected sequences may be changed gradually from 5.0 to 6.0 (e.g., 5-6-5-5-6-5-6-6-5-6). The same subsequences used for steady-state torque demand may be used for transient torque demand situations, or sub-sequences specific to transient torque demand may be used to transition between two different ECCs.

Figure 4:
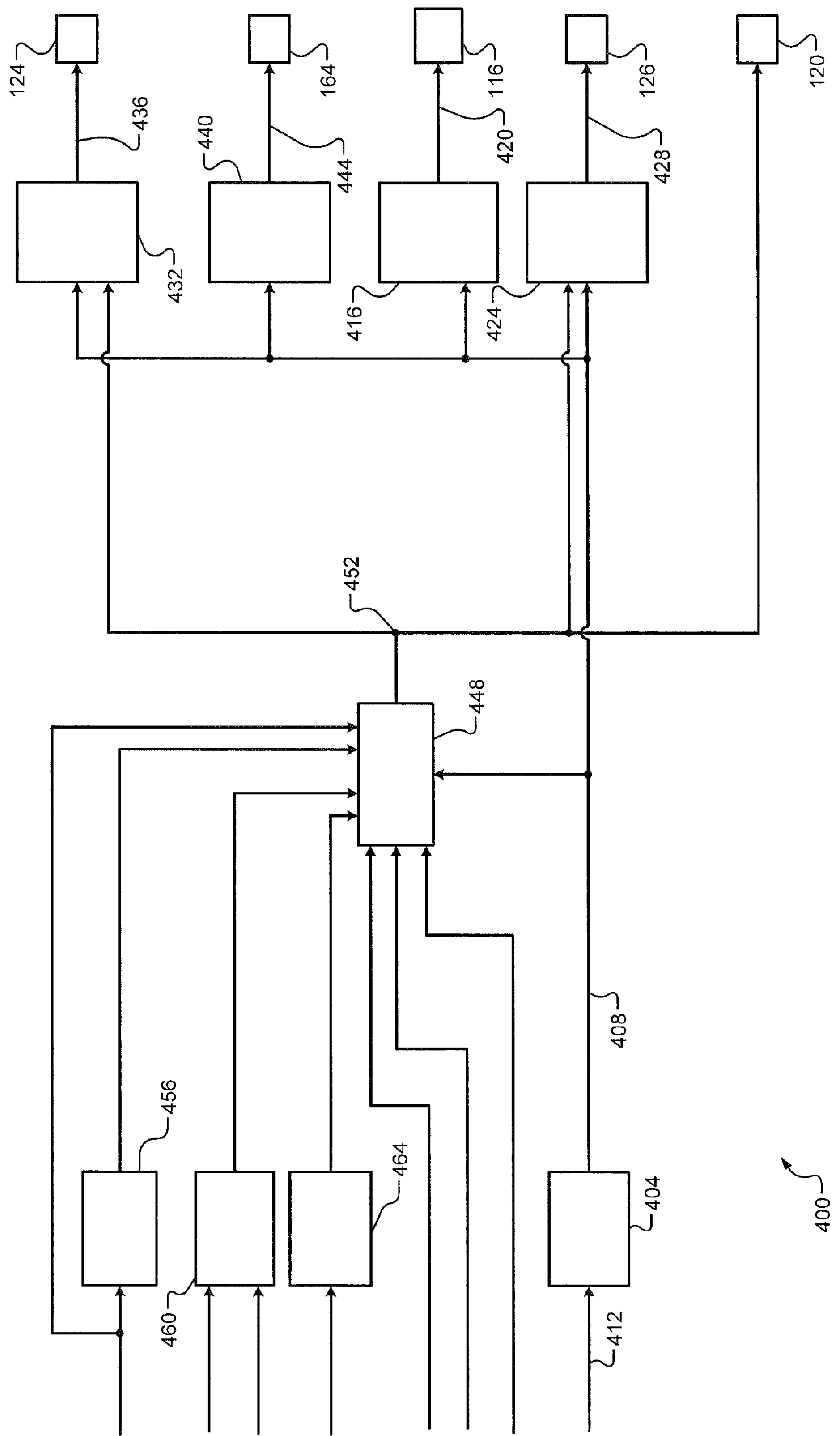
FIG. 4 is a functional block diagram of an engine control module according to the present disclosure.

Referring now to FIG. 4, a functional block diagram of an example engine control module (ECM) 400 is presented. A torque request module 404 may determine a torque request 408 based on one or more driver inputs 412, such as an accelerator pedal position, a brake pedal position, a cruise control input, and/or one or more other suitable driver inputs. The torque request module 404 may determine the torque request 408 additionally or alternatively based on one or more other torque requests, such as torque requests generated by the ECM 400 and/or torque requests received from other modules of the vehicle, such as the transmission control module 194, the hybrid control module 196, a chassis control module, etc.

One or more engine actuators may be controlled based on the torque request 408 and/or one or more other torque requests. For example, a throttle control module 416 may determine a desired throttle opening 420 based on the torque request 408. The throttle actuator module 116 may adjust opening of the throttle valve 112 based on the desired throttle opening 420. A spark control module 424 may determine a desired spark timing 428 based on the torque request 408. The spark actuator module 126 may generate spark based on the desired spark timing 428. A fuel control module 432 may determine one or more desired fueling parameters 436 based on the torque request 408. For example, the desired fueling parameters 436 may include fuel injection amount, number of fuel injections for injecting the amount, and timing for each of the injections. The fuel actuator module 124 may inject fuel based on the desired fueling parameters 436. A boost control module 440 may determine a desired boost 444 based on the torque request 408. The boost actuator module 164 may control boost output by the boost device(s) based on the desired boost 444.

Additionally, a cylinder control module 448 generates a desired cylinder activation/deactivation sequence 452 (e.g., from a plurality of predetermined sub-sequences) based on the torque request 408. The cylinder actuator module 120 deactivates the intake and exhaust valves of the cylinders that are to be deactivated according to the desired cylinder activation/deactivation sequence 452 and activates the intake and exhaust valves of cylinders that are to be activated according to the desired cylinder activation/deactivation sequence 452.

The cylinder control module 448 may select the desired cylinder activation/deactivation sequence 452 also based in part on, for example only, the APC, the RPC, the engine speed, the selected gear, slip, and/or vehicle speed. For example, an APC module 456 determines the APC based on MAP, MAF, throttle, and/or engine speed, an RPC module 460 determines the RPC based on an intake angle and an exhaust angle, EGR valve position, MAP, and/or engine speed, and an engine speed module 464 determines the engine speed based on a crankshaft position. The cylinder control module 448 selectively activates deactivated cylinders in the selected base pattern (and/or selectively deactivates activated cylinders in the selected base pattern) to achieve a desired ECC while minimizing N&V.

Fueling is halted (zero fueling) to cylinders that are to be deactivated according to the desired cylinder activation/deactivation sequence 452 and fuel is provided the cylinders that are to be activated according to the desired cylinder activation/deactivation sequence 452. Spark is provided to the cylinders that are to be activated according to the desired cylinder activation/deactivation sequence 452. Spark may be provided or halted to cylinders that are to be deactivated according to the desired cylinder activation/deactivation sequence 452. Cylinder deactivation is different than fuel cutoff (e.g., deceleration fuel cutoff) in that the intake and exhaust valves of cylinders to which fueling is halted during fuel cutoff are still opened and closed during the fuel cutoff.

Figure 5:
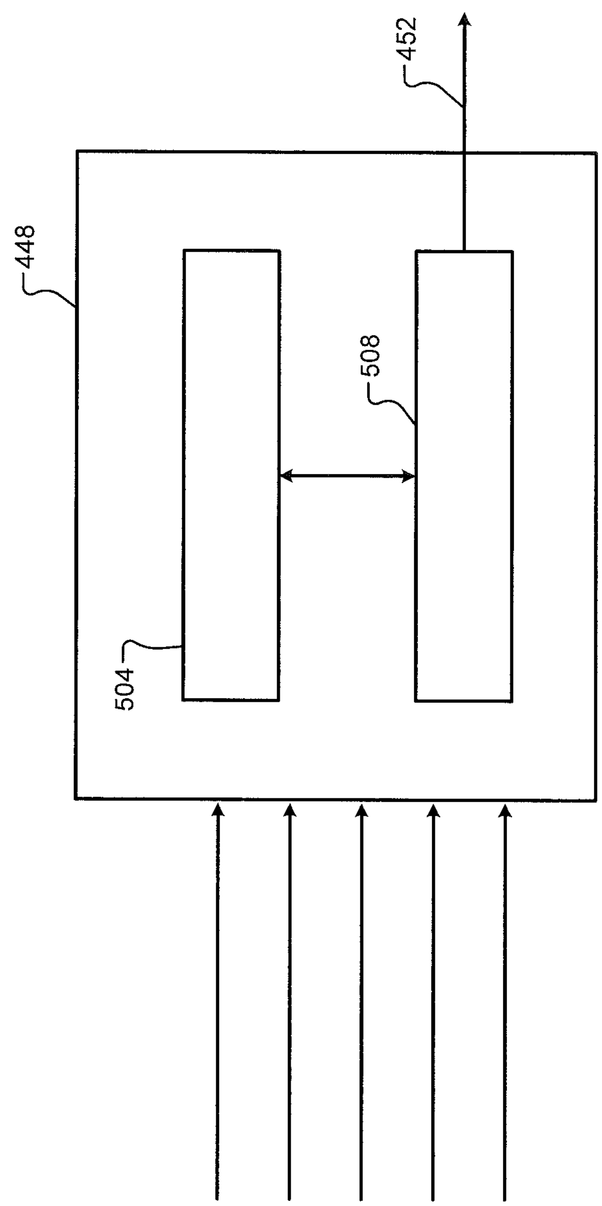
FIG. 5 is a functional block diagram of a cylinder control module according to the present disclosure.

Referring now to FIG. 5, an example implementation of the cylinder control module 448 is shown. N predetermined cylinder deactivation sub-sequences are stored in a pattern database 504. N is an integer greater than or equal to 2 and may be, for example, 3, 4, 5, 6, 7, 8, 9, 10, or another suitable value. Each of the N predetermined deactivation sub-sequences includes an indicator for each of the next M events of a predetermined firing order of the cylinders. M is an integer that may be less than, equal to, or greater than the total number of cylinders of the engine 102. For example only, M may be 20, 40, 60, 80, a multiple of the total number of cylinders of the engine, or another suitable number. M may be calibratable and set based on, for example, the engine speed, the torque request, and/or the total number of cylinders of the engine 102.

Each of the M indicators indicates whether the corresponding cylinder in the predetermined firing order should be activated or deactivated. For example only, the N predetermined deactivation sub-sequences may each include an array including M (number of) zeros and/or ones. A zero may indicate that the corresponding cylinder should be deactivated, and a one may indicate that the corresponding cylinder should be activated, or vice versa.

A pattern selection module 508 selects from the N predetermined deactivation sub-sequences and sets the desired cylinder activation/deactivation sequence 452 based on a selected one of the N predetermined deactivation sub-sequences. The cylinders of the engine 102 are activated or deactivated according to the desired cylinder activation/deactivation sequence 452 in the predetermined firing order. The desired cylinder activation/deactivation sequence 452 may be repeated until one or more different ones of the N predetermined deactivation sub-sequences is/are selected.

The pattern selection module 508 communicates with the pattern database 504 to select a sequence and/or sub-sequence of deactivation patterns based in part on the factors described in FIGS. 1-3 and Tables 1-4, including, but not limited to, the desired ECC, N&V, the torque request, and/or the engine speed. For example, the pattern selection module 508 selects a next sub-sequence of deactivation patterns based on a previous number of sub-sequences of deactivation patterns, desired ECC, N&V, the torque request, and/or the engine speed. The pattern selection module 508 outputs the desired cylinder activation/deactivation sequence 452 based on the selected sub-sequences.

Figure 6:
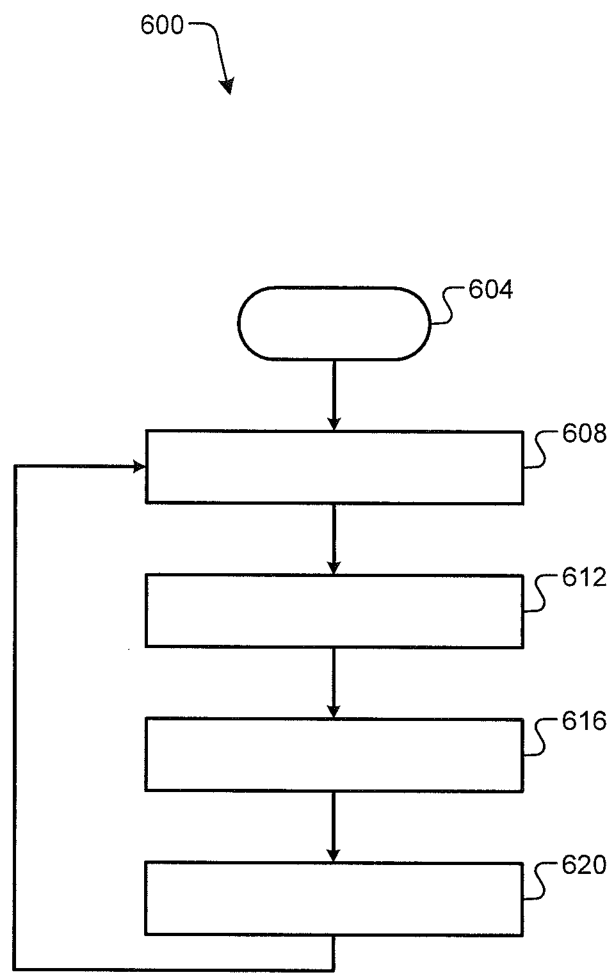
FIG. 6 is a functional block diagram of a cylinder deactivation method according to the present disclosure.

Referring now to FIG. 6, a cylinder deactivation method 600 begins at 604. At 608, the method 600 determines a number of previously selected sub-sequences of deactivation patterns (e.g., 2, 3, 4, etc.). At 612, the method 600 determines one or more current and/or desired operating conditions of the vehicle including, but not limited to, a desired ECC, current and/or desired N&V, engine speed, and/or a torque request. At 616, the method 600 selects at least one next sub-sequence of deactivation patterns based on the previously selected sub-sequences of deactivation patterns and the operating conditions. When more than one of the stored deactivation patterns could be used during a next sub-sequence, which of the more than one stored deactivation patterns can be set, for example, randomly, in a predetermined order, according to predetermined values for usage, etc. At 620, the method 600 controls cylinder activation/deactivation according to the selected next sub-sequence.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A cylinder control system comprising:

a cylinder control module that:

generates a desired cylinder activation/deactivation sequence for cylinders of an engine and for a first predetermined number of crankshaft revolutions using N predetermined cylinder activation/deactivation sub-sequences, each of the N predetermined cylinder activation/deactivation sub-sequences corresponding to a second predetermined number of crankshaft revolutions, wherein N is an integer greater than zero, and the second predetermined number is less than the first predetermined number;

activates opening of intake and exhaust valves of first ones of the cylinders that are to be activated based on the desired cylinder activation/deactivation sequence; and deactivates opening of intake and exhaust valves of second ones of the cylinders that are to be deactivated based on the desired cylinder activation/deactivation sequence; and a fuel control module that provides fuel to the first ones of the cylinders and that disables fueling to the second ones of the cylinders, wherein the cylinder control module further generates the desired cylinder activation/deactivation sequence for a future period based on a desired number of the cylinders to be activated during a predetermined period, P of the N predetermined cylinder activation/deactivation sub-sequences, and an operating condition, and wherein the future period follows the first predetermined number of crankshaft revolutions, the predetermined period includes the first predetermined number of crankshaft revolutions and the future period, and P is an integer between zero and N, inclusive.

2. The cylinder control system of claim 1 wherein the future period includes at least two future firing/non-firing events.

3. The cylinder control system of claim 1 wherein P is greater than one.

4. The cylinder control system of claim 1 wherein the cylinder control module generates the desired cylinder activation/deactivation sequence for the future period based on the desired number of the cylinders to be activated during the predetermined period, P of the N predetermined cylinder activation/deactivation sub-sequences, and an engine speed.

5. The cylinder control system of claim 1 wherein the cylinder control module generates the desired cylinder activation/deactivation sequence for the future period based on the desired number of the cylinders to be activated during the predetermined period, P of the N predetermined cylinder activation/deactivation sub-sequences, and an engine torque request.

6. The cylinder control system of claim 1 wherein the desired number of the cylinders to be activated during the predetermined period is an integer.

7. The cylinder control system of claim 1 wherein the cylinder control module generates the desired cylinder activation/deactivation sequence for the future period further based on predetermined percentages associated with predetermined cylinder activation/deactivation sub-sequences, respectively.

8. The cylinder control system of claim 1 wherein the cylinder control module generates the desired cylinder activation/deactivation sequence for the future period using predetermined cylinder activation/deactivation sub-sequences stored in memory.

9. The cylinder control system of claim 8 wherein the cylinder control module selects from the predetermined cylinder activation/deactivation sub-sequences based on the desired number of the cylinders to be activated during the predetermined period, the P of the N predetermined cylinder activation/deactivation sub-sequences, and the operating condition.

10. The cylinder control system of claim 1 wherein the cylinder control module generates the desired cylinder activation/deactivation sequence for the future period based on noise and vibration.

11. A cylinder control system comprising:

a cylinder control module that:

generates a desired cylinder activation/deactivation sequence for a future period based on Q predetermined cylinder activation/deactivation sub-sequences used during a previous period, a desired number of cylinders to be activated during a predetermined period including the previous and future periods, and an operating condition, wherein Q is an integer greater than zero;

activates opening of intake and exhaust valves of first ones of the cylinders that are to be activated based on the desired cylinder activation/deactivation sequence; and deactivates opening of intake and exhaust valves of second ones of the cylinders that are to be deactivated based on the desired cylinder activation/deactivation sequence; and a fuel control module that provides fuel to the first ones of the cylinders and that disables fueling to the second ones of the cylinders.

12. A cylinder control method comprising:

generating a desired cylinder activation/deactivation sequence for cylinders of an engine and for a first predetermined number of crankshaft revolutions using N predetermined cylinder activation/deactivation sub-sequences, each of the N predetermined cylinder activation/deactivation sub-sequences corresponding to a second predetermined number of crankshaft revolutions, wherein N is an integer greater than zero, and the second predetermined number is less than the first predetermined number;

activating opening of intake and exhaust valves of first ones of the cylinders that are to be activated based on the desired cylinder activation/deactivation sequence;

deactivating opening of intake and exhaust valves of second ones of the cylinders that are to be deactivated based on the desired cylinder activation/deactivation sequence;

providing fuel to the first ones of the cylinders;

disabling fueling to the second ones of the cylinders; and generating the desired cylinder activation/deactivation sequence for a future period based on a desired number of the cylinders to be activated during a predetermined period, P of the N predetermined cylinder activation/deactivation sub-sequences, and an operating condition, wherein the future period follows the first predetermined number of crankshaft revolutions, the predetermined period includes the first predetermined number of crankshaft revolutions and the future period, and P is an integer between zero and N, inclusive.

13. The cylinder control method of claim 12 wherein the future period includes at least two future firing/non-firing events.

14. The cylinder control method of claim 12 further comprising generating the desired cylinder activation/deactivation sequence for the future period based on the desired number of the cylinders to be activated during the predetermined period, P of the N predetermined cylinder activation/deactivation sub-sequences, and an engine speed.

15. The cylinder control method of claim 12 further comprising generating the desired cylinder activation/deactivation sequence for the future period based on the desired number of the cylinders to be activated during the predetermined period, P of the N predetermined cylinder activation/deactivation sub-sequences, and an engine torque request.

16. The cylinder control method of claim 12 wherein the desired number of the cylinders to be activated during the predetermined period is an integer.

17. The cylinder control method of claim 12 further comprising generating the desired cylinder activation/deactivation sequence for the future period further based on predetermined percentages associated with predetermined cylinder activation/deactivation sub-sequences, respectively.

18. The cylinder control method of claim 12 further comprising generating the desired cylinder activation/deactivation sequence for the future period using predetermined cylinder activation/deactivation sub-sequences stored in memory.

19. The cylinder control method of claim 18 further comprising selecting from the predetermined cylinder activation/deactivation sub-sequences based on the desired number of the cylinders to be activated during the predetermined period, the P of the N predetermined cylinder activation/deactivation sub-sequences, and the operating condition.

20. The cylinder control method of claim 12 further comprising generating the desired cylinder activation/deactivation sequence for the future period based on noise and vibration.

* * * * *